US009559837B2

(12) United States Patent
McGregor et al.

(10) Patent No.: US 9,559,837 B2
(45) Date of Patent: *Jan. 31, 2017

(54) METHODS FOR CRYPTOGRAPHIC DELEGATION AND ENFORCEMENT OF DYNAMIC ACCESS TO STORED DATA

(71) Applicant: Trustwave Holdings, Inc., Chicago, IL (US)

(72) Inventors: John Patrick McGregor, Menlo Park, CA (US); Matthew N. White, Pittsburgh, PA (US)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,998

(22) Filed: Sep. 5, 2014

(65) Prior Publication Data

US 2015/0288512 A1    Oct. 8, 2015

Related U.S. Application Data

(63) Continuation of application No. 11/668,462, filed on Jan. 29, 2007, now Pat. No. 8,832,466.
(Continued)

(51) Int. Cl.
*H04L 9/06*     (2006.01)
*G06F 21/62*    (2013.01)
(Continued)

(52) U.S. Cl.
CPC ......... *H04L 9/0618* (2013.01); *G06F 21/6227* (2013.01); *H04L 9/0836* (2013.01);
(Continued)

(58) Field of Classification Search
USPC .......................................................... 380/37
See application file for complete search history.

(56) References Cited

U.S. PATENT DOCUMENTS

| 6,038,665 A * | 3/2000 | Bolt .................... G06F 11/1464 |
|---|---|---|
| | | 707/999.202 |
| 6,615,199 B1 | 9/2003 | Bowman-Amuah |

(Continued)

OTHER PUBLICATIONS

United States Patent and Trademark Office, "Office Action," issued in connection with U.S. Appl. No. 11/668,462, on Apr. 28, 2010, 52 pages.
(Continued)

*Primary Examiner* — Amare F Tabor
(74) *Attorney, Agent, or Firm* — Hanley, Flight & Zimmerman, LLC

(57) ABSTRACT

Efficient methods for assigning, revoking, and realizing access to stored data involve a cryptographic key hierarchy and a set of operations performed on cryptographic keys and performed on the data objects to be protected. In addition to providing confidentiality and integrity for data objects, the methods allow access to selected data objects to be permanently revoked for all entities without requiring all instances of the data objects to be destroyed or overwritten. The methods also support access right modifications for a data object without requiring the re-encryption of the entire data object; instead, certain keys are selectively re-encrypted and re-authenticated to implement access control changes. The key hierarchy is parameterized to enable flexible performance tuning, and to provide efficient random access, keying and other security operations are performed for individual blocks within a data object rather than only for the entire data object.

24 Claims, 10 Drawing Sheets

Related U.S. Application Data

(60) Provisional application No. 60/762,930, filed on Jan. 27, 2006.

(51) Int. Cl.
  *H04L 9/08* (2006.01)
  *H04L 9/32* (2006.01)
  *H04L 9/14* (2006.01)

(52) U.S. Cl.
  CPC .............. *H04L 9/14* (2013.01); *H04L 9/3242* (2013.01); *H04L 2209/24* (2013.01)

(56) References Cited

U.S. PATENT DOCUMENTS

| | | | |
|---|---|---|---|
| 7,088,822 B2 * | 8/2006 | Asano | G11B 20/00086 380/201 |
| 7,093,128 B2 * | 8/2006 | Asano | G11B 20/00086 713/171 |
| 7,185,205 B2 | 2/2007 | Launchbury et al. | |
| 7,334,255 B2 * | 2/2008 | Lin | H04L 63/0428 713/168 |
| 7,356,148 B2 | 4/2008 | Hayashi | |
| 7,505,599 B2 * | 3/2009 | Ishiguro | G06F 21/10 380/278 |
| 7,734,047 B2 * | 6/2010 | Nakayama | G06F 21/10 360/281 |
| 7,756,865 B2 | 7/2010 | Condon et al. | |
| 7,765,180 B2 | 7/2010 | Tamatsu | |
| 8,155,315 B2 * | 4/2012 | Reckless | G11B 27/11 380/216 |
| 2001/0021926 A1 | 9/2001 | Schneck et al. | |
| 2001/0044886 A1 | 11/2001 | Cassagnol et al. | |
| 2002/0152387 A1 * | 10/2002 | Asano | G11B 20/00086 713/176 |
| 2003/0076958 A1 * | 4/2003 | Ishiguro | G06F 21/10 380/277 |
| 2003/0212886 A1 * | 11/2003 | Sugiura | H04L 63/0457 713/150 |
| 2003/0217273 A1 | 11/2003 | McGrath et al. | |
| 2004/0064706 A1 * | 4/2004 | Lin | H04L 63/0428 713/182 |
| 2004/0076404 A1 * | 4/2004 | Nakano | G11B 20/00086 386/200 |
| 2004/0107356 A1 | 6/2004 | Shamoon et al. | |
| 2004/0205199 A1 * | 10/2004 | Gormish | H04L 29/06 709/229 |
| 2005/0166040 A1 | 7/2005 | Walmsley | |
| 2005/0204108 A1 | 9/2005 | Ofek et al. | |
| 2005/0271246 A1 | 12/2005 | Sharma et al. | |
| 2006/0026444 A1 * | 2/2006 | Asano | G11B 20/00086 713/193 |
| 2006/0106857 A1 | 5/2006 | Lillibridge et al. | |
| 2006/0136728 A1 | 6/2006 | Gentry et al. | |
| 2007/0006293 A1 | 1/2007 | Balakrishnan et al. | |
| 2007/0038571 A1 | 2/2007 | Meyer et al. | |
| 2008/0049934 A1 * | 2/2008 | Onoda | G11B 20/00086 380/201 |

OTHER PUBLICATIONS

United States Patent and Trademark Office, "Office Action," issued in connection with U.S. Appl. No. 11/668,462, on Aug. 10, 2011, 22 pages.

United States Patent and Trademark Office, "Office Action," issued in connection with U.S. Appl. No. 11/668,462, on Jun. 15, 2012, 22 pages.

United States Patent and Trademark Office, "Office Action," issued in connection with U.S. Appl. No. 11/668,462, on Oct. 4, 2013, 19 pages.

United States Patent and Trademark Office, "Notice of Allowance," issued in connection with U.S. Appl. No. 11/668,462, on Apr. 30, 2014, 36 pages.

* cited by examiner

*M*-block file *F*:

METHODS FOR CRYPTOGRAPHIC DELEGATION AND ENFORCEMENT OF DYNAMIC ACCESS TO STORED DATA

This patent is a continuation of U.S. patent application Ser. No. 11/668,462, filed Jan. 29, 2007, which claims the benefit under 35 U.S.C. §119(e) of provisional application Ser. No. 60/762,930 filed Jan. 27, 2006. U.S. patent application Ser. No. 11/668,462 and provisional application Ser. No. 60/762,930 are hereby incorporated herein by reference.

BACKGROUND OF THE DISCLOSURE

1. Field of the Disclosure

The present invention relates to cryptographic techniques for protecting stored data that is maintained in and transferred between various media.

2. Description of the Related Art

Cryptographic techniques often are employed to achieve data security objectives such as confidentiality, integrity, origin authentication, and version verification. Examples of cryptographic operations used to realize these security objectives include encryption, one-way hash functions, pseudorandom number generators, and digital signatures.

Data to be protected may be in transit over an interconnection network or at rest on a storage device. A logical data object consists of an arbitrary quantity of data as well as identifying metadata such as the object name, object size,— etc. In storage—or in-transit, the data object may be logically encoded using N bits. A data object that has been subjected to operations to ensure one or more security goals (such as confidentiality and integrity) is henceforth referred to as a protected data object.

Symmetric-key encryption algorithms such as the Data Encryption Standard (DES) or the Advanced Encryption Standard (AES) often are used to provide confidentiality for data objects. Encryption algorithms provide confidentiality by disguising and encoding sensitive data such that an unauthorized entity cannot obtain the encrypted data given a reasonable amount of time and computation resources. FIG. 1 illustrates the operation of a symmetric-key encryption algorithm. A publicly known symmetric-key encryption algorithm accepts as inputs a secret key, K, and the sensitive data to be encrypted, P. The input data P, which is also known as plaintext, may consist of a multiple data objects, a single data object, or a subset of bits from a data object. The secret key is a quantity of information (often random and ranging from 1 bit to thousands of bits in size) that is only known to authorized parties. The output of the encryption algorithm is the ciphertext, C, which can be stored on publicly-accessible data storage media without significant risk of exposing P so long as K remains secret. Upon retrieving C, only authorized entities can compute P using a publicly known symmetric-key decryption algorithm that corresponds to the chosen encryption algorithm. FIG. 2 illustrates a symmetric-key decryption algorithm. As shown in FIG. 2, given the ciphertext C and the secret key K, the decryption algorithm outputs the plaintext P. In many systems, this same secret key K is used to protect multiple plaintext inputs.

Cryptographically-strong one-way hash functions (examples of which include SHA-256 and SHA-512) often are used to provide data integrity for data objects. These hash functions are used to generate keyed message authentication codes (e.g., HMACs) that serve as "fingerprints" for data objects. Fingerprints are appended to their associated data object, and they can be inspected to ensure that the data has not been modified by an unauthorized party. FIG. 3 illustrates the generation of a Hash Message Authentication Code ("HMAC") by an authorized entity using a one-way hash function. The HMAC generation function F accepts a secret key K and an arbitrarily-sized input Z. Only authorized entities possess knowledge of the secret key K. Z consists of data to be protected as well as other data such as the logical or absolute location of the data within the data object. The function F employs multiple iterations of the hash function over encodings of the two inputs to produce a hash fingerprint (i.e., the HMAC) G. The hash fingerprint G is a fixed-sized value (often between 128 and 512 bits in size) that corresponds to the input values, and G is stored or transmitted along with the data Z.

The verification of an HMAC by an authorized entity is illustrated in FIG. 4. An authorized entity applies the secret key K and the data input Z (retrieved from a data object or other sources) as inputs to the function F. The output of F is the HMAC G'. Let G be the value of an HMAC retrieved from the associated data object. The authorized entity then compares the value of G to the value of G'. If they are equivalent, then the integrity of Z is verified; if not, corruption or forgery, i.e., unauthorized writing of new data, has occurred.

By the properties of strong hash functions, it is highly unlikely that two different sets of inputs will yield the same fingerprint, and it is highly unlikely that the value of K can be calculated given a hash fingerprint G and the data input Z. These properties ensure that if an unauthorized entity attempts to write data to a data object without knowledge of K, then it is highly unlikely that the entity would be able to compute a new valid HMAC. Thus, if an unauthorized write occurs, this can be detected by an authorized entity during a subsequent reading of a data object through the process illustrated in FIG. 4.

Symmetric-key encryption algorithms and one-way hash functions can provide a high degree of protection for data, but performance and access control issues do arise in many data security systems when applying these cryptographic techniques.

First, in order to read or write an arbitrary number of bytes at an arbitrary offset within a data object, the security system may require that all or a significant portion of the data object be decrypted/encrypted and hashed to complete the read or write operation. For example, if the encryption algorithm is implemented in the Cipher Block Chaining (CBC) mode of operation, certain write requests will require the entire data object to be written and encrypted to generate the desired ciphertext. This requirement can be mitigated to some degree by employing alternative modes of operation for encryption, but performance issues remain with respect to hashing for data integrity and other security goals.

If one or a small number of HMACs are created and stored for a given data object, the entire data object often may need to be processed in order to verify the HMAC(s) or to generate a new HMAC. That is, many systems require the entire encrypted or plaintext data object to be hashed even when verifying the integrity of a small number of bytes. In systems that employ relatively large data objects, the performance impact of entire-object hashing per each read/write can be prohibitively expensive.

Second, as described above, secret keys must either be provided to or maintained by authorized entities in order for an authorized entity to perform read and write operations on protected data objects. At a given time, there exist a set of entities that are authorized to access a data object, and those access rights are enabled by the ability to retrieve the relevant data object keys. These keys are used as inputs to encryption and one-way hashing algorithms to ensure data confidentiality, data integrity, and other goals. Any entity that has knowledge of such keys and the ability to read/write a data object may possess the ability to interpret the plaintext contents of the data object as well as write arbitrary data to the data object. Thus, if access to a data object for a particular entity is revoked, it is essential that access to the keys corresponding to that data object is prevented for that entity.

In systems where data object keys are made available directly or indirectly to authorized entities in order to perform data object input/output operations, it is possible for the entity to retain direct or indirect knowledge of the data object keys for use at a future time. Thus, in order to guarantee that unauthorized entities cannot access a data object to which they formerly enjoyed access, the data object must be "re-keyed". That is, the data object must be decrypted and hashed with the current data object keys and then re-encrypted and re-hashed with new data object keys. This process ensures that future data written to a data object is not readable by revoked or unauthorized entities, and it ensures that revoked or unauthorized entities cannot write new data to the data object without being detected. If data objects were not re-keyed following access revocation, a revoked entity could employ previously acquired knowledge of the cryptographic keys in conjunction with the most current version of the data object to read or write arbitrary bytes stored within the data object. When access modifications are frequent, this requirement leads to frequent re-keying, which is a significant performance problem in systems with many data objects or with large data objects.

SUMMARY OF THE DISCLOSURE

The present invention comprises methods for efficiently enabling, disabling, and realizing access to one (or multiple) block(s) of data within a data object via cryptographic techniques. An authorized party that possesses access to a data object has the capability to perform one or more operations on the data object, including reading, writing, and access right modification. A data object consists of a set ordered data blocks, where a block is of fixed or variable size. Access is efficiently granted on a block or object basis to one or more entities, and an entity that verifies its identity and that has been granted some type of access to a data object is an authorized entity. Given an arbitrary data object to be protected, metadata associated with the data object is generated and utilized. The metadata consists of per-block metadata, which is information associated with and unique to one or multiple data object block(s), and per-object metadata, which is associated with the entire data object. Per-block metadata may contain identifying information and cryptographic keys associated with one or more blocks. The per-object metadata includes certain cryptographic keys that are used to protect the per-block keys.

Preferred systems and methods of the present invention comprise one or more of the following three components: a logical protected data object structure and a method for creating protected data objects, a hierarchical cryptographic keying model, and any one or a plurality of the following steps, algorithms or methods, which may be implemented in hardware, software, or a combination of hardware and software:

In the event that an authorized entity wishes to read bits of data from a particular set of blocks within a protected data object, a method comprising the steps of: (i) reading the particular protected object blocks, the associated per-object metadata, and the per-object metadata, and (ii) computing the desired plaintext bits and/or verifying the integrity of and/or verifying the origin of and/or verifying the freshness of the desired bits, where the method preferably comprises performing a set of operations on the particular set of protected blocks, on the per-block metadata associated with those blocks, and/or on the per-object metadata.

In the event that an authorized entity wishes to write bits of data to a particular set of blocks within a protected data object, a method for writing data as well as ensuring confidentiality of and/or ensuring integrity of the bits to be written, where the method preferably comprises the steps of: (i) performing a set of operations on the bits to be written, possibly on the particular set of existing protected data object blocks, on the per-block metadata associated with those blocks, and/or on the per-object metadata, (ii) generating a new set of protected data object blocks, new per-block metadata associated with those new blocks, and possibly generating new per-object metadata associated with the data object, and (iii) writing the new protected data object blocks, and/or the associated new per-block metadata, and/or the new per-object metadata to the protected data object.

In the event that an authority wishes to revoke access that an entity currently possesses for a protected data object or an authority wishes to enable access that an entity currently does not possess for a protected data object, a method preferably comprising the steps of: (i) generating new per-object metadata and/or generating new per-block metadata associated with one or more blocks (collectively, the "new metadata") with or without performing any operations on the data blocks and (ii) writing the new metadata to the data object. In the event where an entity's access to a protected data object is revoked, this method ensures that even if the entity were to have stored all key information, metadata, plaintext block data, and ciphertext block data associated with any version of the protected data object prior to the access revocation, then upon obtaining a new version of the protected object, the entity will not be able to obtain any plaintext bits that have been written in ciphertext form to the protected object subsequent to the access revocation, and/or the entity whose access was revoked will not be able to write new bits to the data object without authorized entities being able to detect such unauthorized writing upon inspection of the resulting data object. In the event where an entity's access to a protected data object is enabled, this method may optionally ensure that, given all key information, metadata, and plaintext block data from the current and future versions of the protected object as well as any ciphertext block data from any version of the protected object, the entity will not be able to obtain bits of plaintext block data that existed in versions of the protected object prior to the entity's access enablement that do not exist in current or future versions of the object.

In the event than an authorized entity wishes to disable future access to a single block within a protected data object, to multiple blocks within a protected data object, or to an entire protected data object, a method for generating, employing, and destroying per-block and/or per-object keys such that the destruction of a particular key can selectively prevent any future access to one or more data blocks by any entity.

In accordance with an aspect of the present invention, a computer implemented method for managing a data object comprises: arranging the data object into one or more data blocks each containing a number of bits corresponding to one or more processing lengths; and appending to the data object a data object header and one or more regions of data block metadata, wherein each of the one or more regions of data block metadata corresponds to one or more of the data blocks. The arranging results in the data object having a plurality of data blocks and a plurality of regions of data block metadata, wherein at least one of the regions of data block metadata is adjacent at a first logical location of a first side of the one region of the data block metadata to a first one of the data blocks and is also adjacent at a second logical location of a second side of the one region of the data block metadata to a second one of the data blocks. The arranging results in the data object having a plurality of data blocks and a plurality of regions of data block metadata, wherein a logical location of substantially every one of the regions of data block metadata is disposed immediately adjacent to a side of a first one of the data blocks and a side of a second one of the data blocks. The arranging also may result in the data object having a plurality of data blocks and a plurality of regions of data block metadata, wherein regions of data block metadata are interleaved between the data blocks.

In accordance with further aspect of the present invention, the computer implemented method may further comprise: assigning to the data object one or more keys from the group consisting of a data object encryption key, a data object decryption key, and a data object hash key; or assigning to one or more of the data blocks one or more keys from the group consisting of a per-block encryption key, a per-block decryption key, and a per-block hash key.

In accordance with another aspect of the present invention, the computer implemented method may also result in the data object having a plurality of data blocks each containing a number of bits corresponding to the one or more processing lengths. Alternately, at least one of the regions of data block metadata is disposed between two of the data blocks. Moreover, substantially every one of the data blocks is adjacent to two of the regions of data block metadata with or without at least one of the data blocks not being adjacent to two of the regions of data block metadata.

In accordance with yet another aspect of the present invention, the arranging results in the data object having a plurality of data blocks and a plurality of regions of data block metadata, wherein at least one of the regions of data block metadata is adjacent at a first logical location of a first side of the one region of the data block metadata to a first one of the data blocks and is also adjacent at a second logical location of a second side of the one region of the data block metadata to a second one of the data blocks.

In accordance with a further aspect of the present invention, the arranging results in the data object having a plurality of data blocks and a plurality of regions of data block metadata, wherein a logical location of substantially every one of the regions of data block metadata is disposed immediately adjacent to a side of a first one of the data blocks and a side of a second one of the data blocks.

In accordance with an additional aspect of the present invention, the arranging results in the data object having a plurality of data blocks and a plurality of regions of data block metadata, wherein the regions of data block metadata are interleaved between the data blocks.

In another aspect of the present invention, the computer implemented method may further comprise: assigning to each of the one or more data blocks one or more keys from the group consisting of a per-block encryption key, a per-block decryption key, and a per-block hash key; performing one or more cryptographic operations on one or more of the data blocks using one or more keys from the group consisting of assigned per-block encryption keys, assigned per-block decryption keys, and assigned per-block hash keys; encrypting or decrypting one or more of the one or more data blocks using a cipher and an assigned per-block encryption key or an assigned per-block decryption key, respectively; hashing one or more of the one or more data blocks using an assigned per-block hash key and a hash function. The cipher may comprise an algorithm from the group consisting of public-key encryption algorithms and symmetric-key encryption algorithms.

In yet another aspect of the present invention, the computer implemented method may further comprise: encrypting or decrypting one or more of the data blocks using a cipher and an assigned per-block encryption key or an assigned per-block decryption key, respectively; hashing one or more of the one or more data blocks using an assigned per-block hash key and a hash function; performing one or more cryptographic operations on one or more of the data blocks using one or more keys from the group consisting of assigned per-block encryption keys, assigned per-block decryption keys, and assigned per-block hash keys; encrypting or decrypting each of the data blocks using a cipher and an assigned per-block encryption key or an assigned per-block decryption key, respectively; hashing each of the data blocks using its assigned per-block hash key and a hashing function.

In a further aspect of the present invention, the computer implemented method may further comprise: creating a hierarchical key tree having the data object encryption key and the data object decryption key disposed in a top node of the key tree and a having bottom row of nodes, each bottom row node containing one or more bottom row keys from the group consisting of one of the per-block encryption keys, one of the per-block decryption keys, and one of the per-block hash keys; encrypting each of the bottom row keys with the data object encryption key; storing each encrypted per-block decryption key in a region of per-block metadata associated with the data block to which the per-block decryption key was assigned; storing each encrypted per-block hash key in a region of per-block metadata associated with the data block to which the per-block hash key was assigned.

In an additional aspect of the present invention, the computer implemented method may further comprise: creating a hierarchical key tree having the data object encryption key and the data object decryption key disposed in a top node of the key tree, at least one set of intermediate nodes wherein each intermediate node contains one or more keys selected from the group of an intermediate encryption key and an intermediate decryption key, and a bottom row of nodes, each bottom row node containing one or more bottom row keys from the group consisting of one of the per-block encryption keys, one of the per-block decryption keys, and one of the per-block hash keys; defining a key path for each bottom row key leading from that bottom row key to the data object encryption key via one or more of the intermediate encryption keys; encrypting each key on each key path except for the data object encryption key with the next key on that key path moving from the bottom row to the top node of the hierarchical key tree; storing each encrypted key contained by a bottom row node in a region of per-block metadata associated with the data block to which the bottom row node was assigned.

In additional aspects of the present invention, each encrypted data block contains a number of bits corresponding to one of the processing lengths; each of the per-block encryption keys is associated with only one of the data blocks; each of the per-block decryption keys is associated with only one of the data blocks; the per-block decryption key assigned to a data block may be equivalent to the per-block encryption key assigned to a data block for all data blocks in the data object; the decryption key assigned to a data object may be equivalent to the encryption key assigned to a data object; each of the per-block hash keys is associated with only one of the data blocks.

In a further aspect of the present invention, each of the regions of data block metadata has a dimension selected from the group consisting of a fixed size, a size that varies over time and a size that varies between the data blocks.

In a further aspect of the present invention, data object header contains one or more items of data object metadata selected from the group consisting of a protected data object identifier, access right information, data object version information, time information relating to the data object, data object encoding information and data object cryptographic key information.

In still a further aspect of the present invention, data object metadata has a dimension selected from the group consisting of a fixed size and a size that varies over time.

In a further aspect of the present invention, the hierarchical key tree is stored in the data object header, is stored in one or more of the regions of data block metadata, or is stored in part in the data object header and in part in one or more of the regions of data block metadata.

In yet a further aspect of the present invention, each of the intermediate keys is stored in one or more of the regions of data block metadata.

In an additional aspect of the present invention, the computer implemented method may further comprise: generating for each of the data blocks a per-block hash value or a per-block hash message authentication code (HMAC) using, as inputs to a hash function, one or more inputs from the group consisting of the data block's per-block hash key, data contained in the data block in encrypted form, and data contained in the data block in plaintext form; storing each of the per-block hash values or per-block HMACs in one or more regions of data block metadata; generating a data object hash value for the data object by computing a hash function over one or more of the per-block hash values and the per-block HMACs; generating a data object hash value using a hierarchical hashing tree such as a Merkle tree; generating a data object HMAC for the data object using the data object hash key as a hash function input and one or more hash function inputs selected from the group consisting of the data object hash value, a data object version number and data object metadata.

In a further aspect of the present invention, a computer implemented method for reading a protected data object or a portion thereof stored in a memory of a computer, wherein the protected data object comprises a plurality of encrypted data blocks and one or more regions of data block metadata, each associated with one or more of the encrypted data blocks, comprises: receiving as an input to an application supported by the computer a data object decryption key assigned to the data object; reading a first of the encrypted data blocks from the memory; reading a hierarchical key tree associated with the protected data object from one or more of the regions of data block metadata and/or a data object header stored in the protected data object; decrypting in succession, using a set of one or more first decryption algorithms, one or more encrypted first path keys on a first key path of the hierarchical key tree from a top node thereof comprising a plaintext version of the data object decryption key to a node in a bottom row thereof comprising an encrypted per-block decryption key for the first encrypted data block by decrypting each of the one or more encrypted first path keys, starting with decrypting the encrypted first path key immediately following the data object decryption key using the data object decryption key and continuing with decrypting each next encrypted first path key with the decrypted version of the preceding first path key moving from the top node to the bottom row until a decrypted version of the per-block decryption key for the first encrypted data block is obtained; and decrypting, using the per-block encryption key and a second decryption algorithm, the first encrypted data block to produce a first decrypted data block. The second decryption algorithm is the same as at least one of the set of first decryption algorithms or the second decryption algorithm is not the same as at least one of the set of first decryption algorithms. Further, the protected data object may comprise a plurality of regions of data block metadata and the regions of data block metadata may be interleaved between the data blocks.

In yet another aspect of the present invention, a computer implemented method for reading a protected data object or a portion thereof stored in a memory of a computer, wherein the protected data object comprises a plurality of encrypted or plaintext data blocks and one or more regions of data block metadata, each associated with one or more of the data blocks, comprises: receiving as an input to an application supported by the computer a data object decryption key assigned to the data object; reading a first of the data blocks from the memory; reading a hierarchical key tree associated with the protected data object from one or more of the regions of data block metadata and/or a data object header associated with the protected data object; decrypting in succession, using a set of one or more first decryption algorithms, one or more encrypted first path keys on a first key path of the hierarchical key tree from a top node thereof comprising a plaintext version of the data object decryption key to a node in a bottom row thereof comprising an encrypted per-block hash key for the first data block by decrypting each of the one or more encrypted first path keys, starting with decrypting the encrypted first path key immediately following the data object decryption key using the data object decryption key and continuing with decrypting each next encrypted first path key with the decrypted version of the preceding first path key moving from the top node to the bottom row until a decrypted version of the per-block hash key for the first data block is obtained. In this aspect of the invention, the computer implemented method for reading a protected data object or a portion thereof may also comprise: generating for the first data block, a generated per-block hash value or a generated per-block hash message authentication code (HMAC) using as inputs one or more of the group consisting of the per-block hash key and data contained in the first data block; comparing the generated per-block hash value for the first data block with a stored per-block hash value read from the memory; comparing the generated per-block HMAC for the first decrypted data block with a stored per-block HMAC read from the memory; reading all or a portion of a hierarchical tree of hashes associated with the protected data object and a stored, data object hash value or data object HMAC from one or more of the regions of data block metadata and/or the data object header wherein the tree of hashes may have a row of bottom nodes each comprising (i) one of a stored per-block hash value for one or more of the plurality of data blocks or (ii) one of a stored per-block HMAC for one or more of the plurality of data blocks; generating a generated data object hash value for the data object using the hash tree (i) by substituting the generated per-block hash value for the first data block for the stored per-block hash value for the first data block in the row of bottom nodes and recalculating all or a portion of the hash tree to produce the generated data object hash value or (ii) by substituting the generated per-block HMAC for the first data block for the stored per-block HMAC for the first data block in the row of bottom nodes and recalculating all or a portion of the hash tree to produce the generated data object hash value; generating a generated data object HMAC for the data object using a decrypted version of an encrypted data object hash key read from one or more of the regions of data block metadata and/or the data object header and the data object hash value as inputs to a hash function; comparing the generated data object HMAC for the data object with a stored data object HMAC for the data object read from the memory; issuing a notification that the data from the first data block has been modified and/or accessed without authorization if the generated data object HMAC for the data object is not equal to the stored data object HMAC for the data object; issuing a notification that the data from the first decrypted data block has been modified and/or accessed without authorization if the generated per-block HMAC for the first data block is not equal to the stored per-block HMAC for the first data block.

In a further aspect of the present invention, a computer implemented method for modifying a protected data object or a portion thereof stored in a memory of a computer, wherein the protected data object comprises a plurality of data blocks and one or more regions of data block metadata, each associated with one or more of the data blocks, comprises: generating a new first path decryption key for each of one or more first path keys on a first key path, including a per-block decryption key but excepting a data object decryption key, in a hierarchical key tree read from one or more of the regions of data block metadata and/or a data object header and associated with the protected data object. This aspect of the invention may further comprise one or more of: encrypting a first modified data block with a first encryption algorithm using a new per-block encryption key that corresponds to the new per-block decryption key to produce an encrypted first modified data block; logically inserting the new per-block decryption key into a node in a bottom row of the hierarchical key tree corresponding to the first modified data block and inserting the new first path keys into their respective nodes on the first key path; and starting with the new per-block decryption key for the first modified data block, encrypting, using one or more encryption algorithms selected from a set of second encryption algorithms, each of the new first path decryption keys on the first key path with a new encryption key that corresponds to the next of the new first path decryption keys on the first key path moving in a direction on the first key path from the bottom row to a top node of the hierarchical key tree, comprising the data object decryption key, with the new first path key immediately preceding the data object decryption key on the first key path with respect to the direction being encrypted with a data object encryption key corresponding to the data object decryption key; writing the encrypted first modified data block to one of the data blocks of the protected data object; and writing the encrypted new first path keys to one or more regions of the data block metadata of the protected data object.

In yet a further aspect of the present invention, a computer implemented method for modifying a protected data object or a portion thereof stored in a memory of a computer, wherein the protected data object comprises a plurality of data blocks and one or more regions of data block metadata, each associated with one or more of the data blocks, comprises: generating for a first modified data block, a new per-block hash value using as a hash function input data contained in the first modified data block or a new per-block hash message authentication code (HMAC) using as hash function inputs a new per-block hash key and data contained in the first modified data block; writing the new per-block hash value or the new per-block HMAC to data block metadata associated with the modified data block in the protected data object; and writing the first modified data block to one of the data blocks of the protected data object. This aspect of the invention may further comprise one or more of: generating a new data object hash value for the data object using all or a portion of a hierarchical tree of hashes read from one or more of the regions of block metadata and/or the data object header associated with the protected data object (i) by substituting the new per-block hash value for the first modified data block for a prior per-block hash value for a corresponding first data block in a row of bottom nodes of the hash tree and recalculating all or a portion of the hash tree to produce the new data object hash value or (ii) by substituting the new per-block HMAC for the first modified data block for a prior per-block HMAC for the first corresponding data block in the row of bottom nodes of the tree of hashes and recalculating all or a portion of the tree of hashes to produce the new data object hash value; generating a new data object HMAC for the data object using a data object hash key read from the data object header and the new data object hash value as inputs to a hash function, and writing the new data object HMAC to the data object header; generating a new first path key for each of one or more first path keys on a first key path, including the new per-block hash key but excepting a data object decryption key, in a hierarchical key tree, wherein all keys on the key path other than the new per-block hash key are decryption keys, read from one or more of the regions of data block metadata and/or a data object header, and associated with the protected data object; logically inserting the new per-block hash key into a node in a bottom row of the hierarchical key tree corresponding to the first modified data block and inserting the new first path keys into their respective nodes on the first key path; and starting with the new per-block hash key for the first modified data block, encrypting, using one or more encryption algorithms selected from a set of second encryption algorithms, each of the new first path keys on the first key path with a new encryption key that corresponds to the next of the new first path decryption keys on the first key path moving in a direction on the first key path from the bottom row to a top node of the hierarchical key tree, comprising the data object decryption key, with the new first path key immediately preceding the data object decryption key on the first key path with respect to the direction being encrypted with a data object encryption key corresponding to the data object decryption key; writing the encrypted new first path keys to one or more regions of the data block metadata of the protected data object; incrementing a version number of the data object.

In yet another aspect of the present invention, a computer implemented method for enforcing access rights changes for a protected data object or a portion thereof stored in a memory of a computer, wherein the protected data object comprises a plurality of data blocks and one or more regions of data block metadata, each associated with one or more of the data blocks, comprises: receiving as an input to an application supported on the computer a first data object decryption key assigned to the data object; reading a hierarchical key tree from the memory, wherein the hierarchical key tree comprises the first data object decryption key disposed in a top node of the hierarchical key tree and one or more of the following items selected from the group consisting of an intermediate row of nodes wherein each of the nodes contains an encrypted intermediate decryption key and a bottom row of nodes wherein each of the nodes contains at least one key, an encrypted per-block decryption key, and wherein a plurality of key paths, each consisting of two keys, have been defined in the hierarchical key tree, each of the key paths having a first end point comprising the top node and a second end point comprising one of the intermediate row nodes or one of the bottom row nodes; using the first data object decryption key, decrypting in succession using a set of one or more first decryption algorithms each encrypted key on each of the plurality of key paths, except for the first data object decryption key, starting with decrypting each encrypted key immediately following the first data object decryption key using the first data object decryption key and continuing with decrypting each next encrypted key on each key path with the decrypted version of the preceding key on each key path moving from the top node to the second end point of each key path; generating a new data object decryption key and a corresponding new data object encryption key associated with the data object; and encrypting each key on each of the plurality of key paths, by starting at the second end point of each of the key paths and encrypting each key on the key path, except for the new data object encryption key, with the new data object encryption key.

The above aspect of the invention may further comprise one or more of: after the encrypting, writing the encrypted keys on the key paths to a subset of the nodes of the hierarchical key tree that is stored in the memory; and writing the new data object decryption key in encrypted form to the top node of the hierarchical key tree that is stored in the memory; discarding all encrypted versions and all plaintext versions of the first data object decryption key and of any data object encryption key corresponding to the first data object decryption key. Moreover, the new data object encryption key may be equivalent to the new data object decryption key; the new data object encryption key may not be equivalent to the new data object decryption key. Also, the generating may be initiated by an entity having the authority to modify access rights to the protected data object.

In another aspect of the present invention, a computer implemented method for enforcing access rights changes for a protected data object or a portion thereof stored in a memory of a computer, wherein the protected data object comprises a plurality of data blocks and one or more regions of data block metadata, each associated with one or more of the data blocks, comprises: generating a new data object hash key associated with the data object; reading, from the memory, data object metadata associated with the data object containing one or more data values from the group consisting of a data object hash value, per-block hash values associated with the data blocks, per-block hash message authentication code (HMAC) values associated with the data blocks, a data object identifier, access right information, a data object version number, time information relating to the data object, data object encoding information, and data object cryptographic key information; generating a new data object hash message authentication code (HMAC) for the data object using, as inputs to a hash function, the new data object hash key and one or more data values selected from the group of data values; and writing the new data object HMAC to the data object metadata. Here, the data object hash value may be generated using a hierarchical tree of hashes associated with the protected data object wherein the hierarchical tree of hashes comprises a row of nodes wherein each of the nodes comprises a per-data block hash value associated with one or more data blocks of the protected data object. Also, the generation of the data object hash message authentication code may directly involve the data object hash value computed using a tree of hashes but preferably does not directly involve the per-block hash values or the per-block HMACs.

The above aspect of the invention may further comprise one or more of: prior to generating the new data object hash message authentication code, incrementing the version number for the data object; and writing the incremented version number to the data object metadata. Here the generating of the new data object hash key associated with the data object may be initiated by an entity having authority to modify access rights to the protected data object.

In a further aspect of the present invention, a computer implemented method for an entity to disable access to a protected data object stored in a memory of a computer, comprises: generating, on the computer, a data object encryption key; encrypting directly or indirectly, on the computer, the data object with the data object encryption key and a first encryption algorithm to produce an encrypted data object; sending, by the computer, the data object encryption key to the entity; encrypting, by the entity, the data object encryption key Q times, where Q is one or greater, using one or more second encryption keys and one or more second encryption algorithms to produce an encrypted data object encryption key; sending, by the entity, the encrypted data object encryption key to the computer; and destroying, by the entity, the one or more encryption keys and/or the one or more second encryption algorithms to disable access to the data object. Here, if the number of encryption operations Q is greater than one, then the inputs to the jth encryption operation may be one of the one or more encryption keys and the output of the (j−1)th encryption operation, where j is greater than one and fewer than Q+1.

The above aspect of the invention may further comprise one or more of: prior to the destroying, by the entity, of the one or more encryption keys and/or the one or more encryption algorithms to disable access to the data object, requesting and receiving from the entity, by the computer, the data object encryption key in decrypted form; directly or indirectly decrypting, on the computer, the encrypted data object using the data object encryption key and the first encryption algorithm to produce the data object. Also, where the encrypted data object consists of a plurality of encrypted data blocks, this aspect of the invention may further comprise: directly or indirectly decrypting, on the computer, one or more of the encrypted data blocks using the data object encryption key and the first encryption algorithm to produce the one or more data blocks of the data object. The entity may be embedded in hardware on the computer; located on another computer with the sending steps being performed via a network; or the entity may be embedded in software on the computer. This aspect of the invention may additionally comprise one or more of: after the sending, by the computer, of the data object encryption key to the entity, destroying, on the computer, all remaining plaintext copies of the data object encryption key stored in the computer; after the receiving, by the computer, of the data object encryption key from the entity, destroying, on the computer, all remaining plaintext copies of the data object encryption key stored in the computer; sending, by the computer, the encrypted data object and the encrypted data object encryption key to a second computer; prior to the destroying, by the entity, of the one or more encryption keys and/or the one or more encryption algorithms to disable access to the data object, requesting and receiving from the entity, by the second computer, the data object encryption key in decrypted form; directly or indirectly decrypting, on the second computer, the encrypted data object using the data object encryption key and the first encryption algorithm to produce the data object. Also, where the encrypted data object consists of a plurality of encrypted data blocks, this aspect of the present invention may further comprise: directly or indirectly decrypting, on the second computer, one or more of the encrypted data blocks using the data object encryption key and the first encryption algorithm to produce the one or more data blocks of the data object.

In another aspect of the present invention, a computer implemented method for an entity to disable access to a protected data object or a portion thereof stored in a memory of a computer, wherein the data object comprises a plurality of data blocks, comprises: generating, on the computer, a data object encryption key; encrypting, on the computer, each of the data blocks with one or more data block encryption keys and a first encryption algorithm; encrypting, on the computer, each of the one or more per-data block encryption keys directly or indirectly using one or more second encryption algorithms and a hierarchical key tree with the data object encryption key employed as a top node of the hierarchical key tree and each of the one or more data block encryption keys disposed in one or more bottom row nodes of the hierarchical key tree; sending, by the computer, the data object encryption key to the entity; encrypting, on the entity, the data object encryption key, Q times, where Q is one or greater, using one or more encryption keys and one or more of a first set of encryption algorithms, wherein if the number of encryption operations Q is greater than one, then the inputs to the jth encryption operation are one of the one or more encryption keys and the output of the (j−1)th encryption operation, where j is greater than one and fewer than Q+1, to produce an encrypted data object encryption key; sending, by the entity, the encrypted data object encryption key to the computer; and destroying, by the entity, the one or more encryption keys and/or the one or more of the first set of encryption algorithms to disable access to the data object. The above aspect of the invention may further comprise: after the sending, by the computer, of the data object encryption key to the entity, destroying, on the computer, all remaining plaintext copies of the data object encryption key stored in the computer. Here, the hierarchical key tree may be stored within the protected data object.

In a further aspect of the present invention, a computer implemented method for an entity to disable access to a protected data object stored in a memory of a computer, comprises: generating, by the entity, a data object encryption key; sending, by the entity, the data object encryption key to the computer; encrypting directly or indirectly, on the computer, the data object with the data object encryption key and a first encryption algorithm to produce an encrypted data object; encrypting, by the entity, the data object encryption key Q times, where Q is one or greater, using one or more second encryption keys and one or more second encryption algorithms to produce an encrypted data object encryption key; sending, by the entity, the encrypted data object encryption key to the computer; and destroying, by the entity, the one or more encryption keys and/or the one or more second encryption algorithms to disable access to the data object. Here again, if the number of encryption operations Q is greater than one, then the inputs to the jth encryption operation may be one of the one or more encryption keys and the output of the (j−1)th encryption operation, where j is greater than one and fewer than Q+1. This aspect of the present invention may further comprise: after the encrypting directly or indirectly of the data object, by the computer, destroying, on the computer, all remaining plaintext copies of the data object encryption key stored in the computer.

In another aspect of the present invention, a computer implemented method for deleting a first data block from a protected data object stored in a memory of a computer, wherein the protected data object comprises a plurality of data blocks and one or more regions of data block metadata, each associated with one or more of the data blocks, comprises: deleting the first data block from the memory; and deleting a key path corresponding to the first data block in a hierarchical key tree read from one or more of the regions of data block metadata and/or a data object header by (i) deleting at least a bottom row node on the key path in a bottom row of the hierarchical key tree containing a per-block cryptographic key corresponding to the first data block or (ii) deleting one or more nodes on the key path, excepting a top node thereon.

In yet another aspect of the present invention, a computer implemented method for appending a first data block from a protected data object stored in a memory of a computer, wherein the protected data object comprises a plurality of data blocks and one or more regions of data block metadata, each associated with one or more of the data blocks, comprises: appending the first data block in encrypted or plaintext from to the protected data object in the memory; and adding a key path corresponding to the first data block in a hierarchical key tree read from one or more of the regions of data block metadata and/or a data object header by (i) adding at least a bottom row node on the key path in a bottom row of the hierarchical key tree to contain a per-block cryptographic key corresponding to the first data block or (ii) adding one or more nodes on the key path, excepting a top node thereon.

BRIEF DESCRIPTION OF THE DRAWINGS

The above and other objects and advantages of the present invention will become apparent from the following description when read in conjunction with the accompanying drawings wherein.

DETAILED DESCRIPTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description of the present invention and the preferred embodiment(s) thereof is set forth in detail below with reference to the attached drawings.

Figure 1:
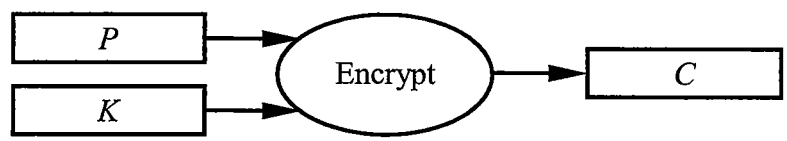
FIG. 1 is a simplified flowchart depicting a prior art process for symmetric-key encryption of plaintext data.
Figure 2:
FIG. 2 is a simplified flowchart depicting a prior art process for symmetric-key decryption of plaintext data.
Figure 3:
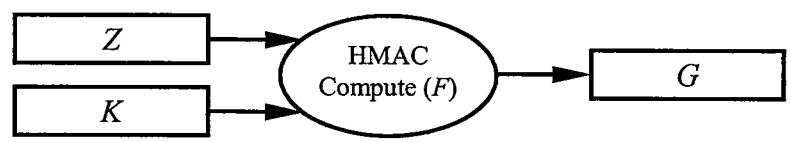
FIG. 3 is a simplified flowchart depicting a prior art process for the computation of a hash message authentication code (HMAC) over input data and a secret key.
Figure 4:
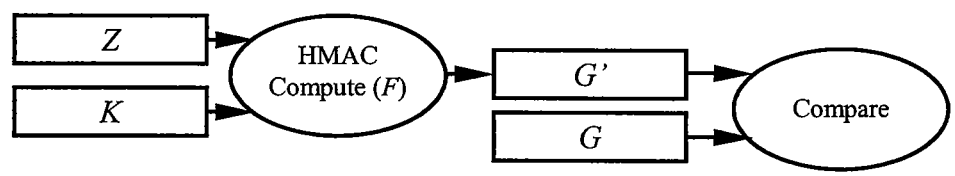
FIG. 4 is a simplified flowchart depicting a prior art process for the verification of an HMAC.
Figure 5:
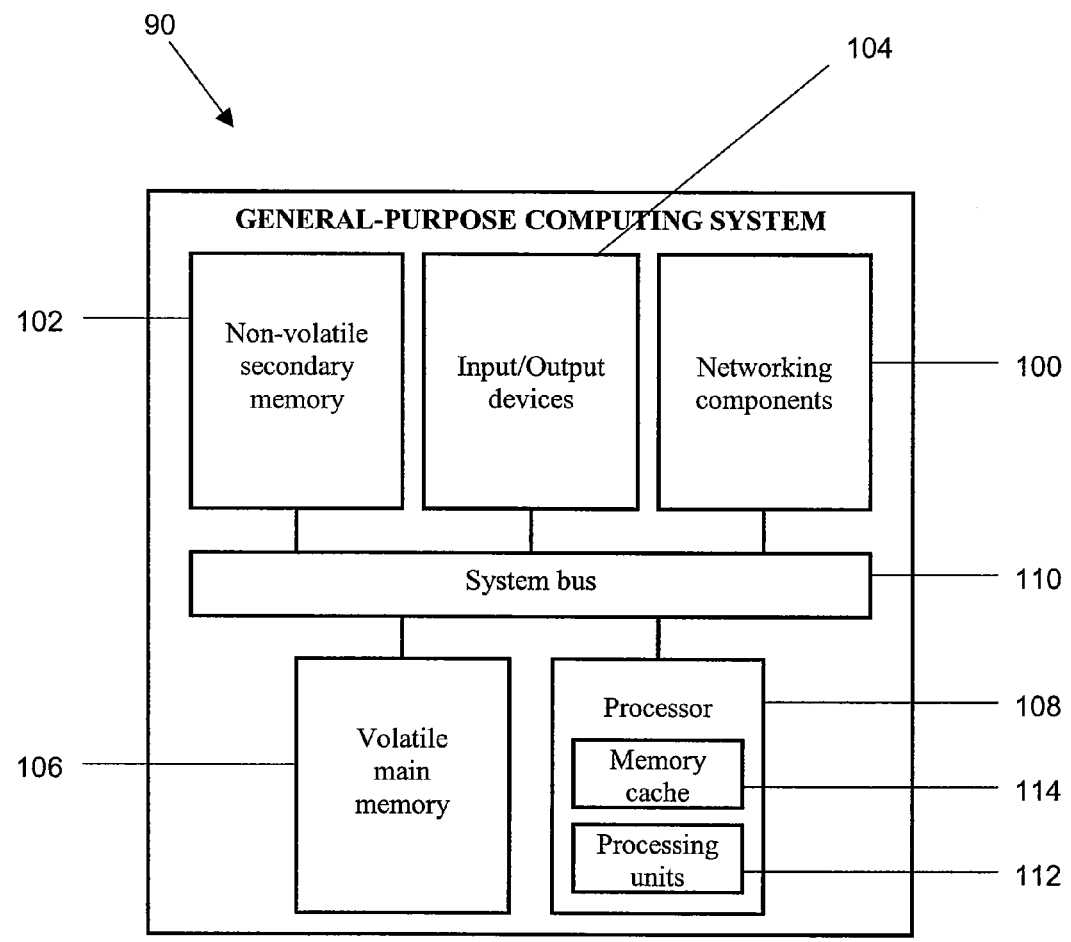
FIG. 5 illustrates a preferred hardware implementation of a general-purpose computing system for use in a preferred embodiment of the system of the present invention.

Though many hardware and software approaches for implementing the present invention are feasible, a preferred embodiment of the present invention comprising a system for protecting individual stored data objects—at times referred to herein as files—is a software implementation for a general-purpose computing system. Referring now to the drawings, wherein like reference numerals designate corresponding structure throughout the views, FIG. 5 illustrates one possible preferred hardware configuration 90 of a general-purpose computing system according to the present invention. The system hardware comprises networking components 100 such as Ethernet adapters, non-volatile secondary memory 102 such as magnetic disks, input/output devices 104 such as keyboards and visual displays, volatile main memory 106, and a processor 108. All of these system hardware components can be connected via a common system bus 110. The processor 108 comprises processing units 112 and on-chip storage devices 114 such as memory caches. A preferred embodiment is application software that is stored in non-volatile memory devices 102 while not in use; when the software is needed, the software is loaded into volatile main memory 106. After being loaded into main memory 106, the processor 108 can read software instructions from main memory 106 and perform useful operations by executing sequences of the software instructions on data that is read into the processor 108 from volatile main memory 106. Upon completion, certain data results of the instructions are written to volatile main memory 106. Alternatively, the steps of the present invention might be performed by specific hardware components that contain hard-wired logic for performing the steps, or by any combination of programmed computer components and custom hardware components.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting $D+E=F$ as an additive function whose implementation in hardware and/or software would take two inputs (D and E) and produce a summation output (F). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Figure 6:
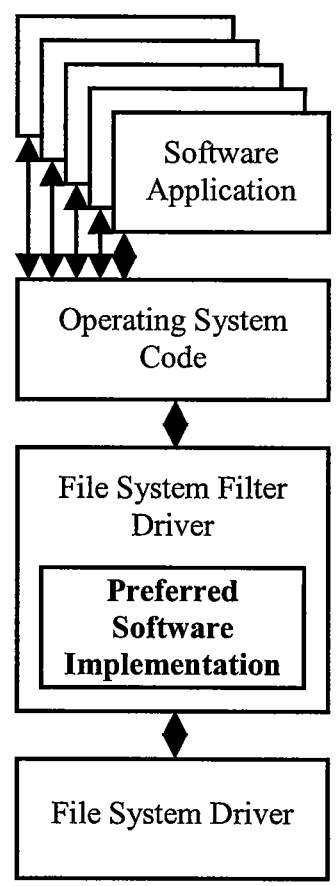
FIG. 6 illustrates a preferred logical location of a software implementation of a preferred embodiment of the present invention in a general-purpose computing system.

FIG. 6 illustrates a preferred logical location of a preferred software program of the present invention in a general-purpose computing system. The boxes in FIG. 6 represent software code modules, and the arrows represent file input/output (I/O) operations. As shown in FIG. 6, a software implementation according to the present invention is preferably contained within a Microsoft Windows file system filter driver (or the equivalent of such a filter driver in other operating systems). A file system filter driver intercepts file system I/O to perform certain operations prior to sending file data to the underlying file system or subsequent to retrieving data from the underlying file system, and such a preferred software implementation and/or a file system filter driver may communicate with other software code modules in the general purpose computing system. Furthermore, in many systems in which it is installed, such a preferred software implementation of the present invention does not require changes to the software applications or to the operating system kernel. In reference to FIG. 6, other preferred software implementations of the present invention may be contained in the Software Application(s), the Operating System Code, and/or the File System Driver.

Figure 7:
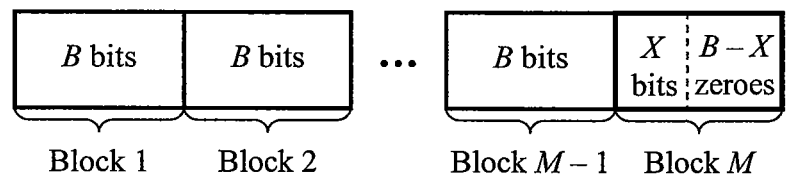
FIG. 7 illustrates a preferred structure of a logical file in a preferred embodiment of the present invention.

A file F to be protected consists of N bits. In a preferred embodiment of the present invention, the file is logically divided into MB-bit blocks, as shown in FIG. 7. The size of B can be adjusted as needed, but in a preferred embodiment, the size of B is 8192 bytes, which equals 65536 bits. If F is not aligned to B bits (i.e., the last block consists of a number of bits X that is fewer than B bits because N is not evenly divisible by B), then the minimal number of zero bits is appended to the logical representation of the file such that the size of the appended file is evenly divisible by B. The last block in FIG. 7 illustrates the appended zeroes. In alternative embodiments of the present invention, the file is not required to be padded with zeroes when N is not evenly divisible by B.

In one or more preferred embodiments of the present invention, software is utilized to protect file data and to perform security operations on protected file data. Prior to the execution of any of these operations, unprotected file data must be converted into protected file data. Given an N-bit B-bit-aligned file F, the file is protected on a block-by-block basis to obtain a protected file F' of size N' bits.

Figure 8:
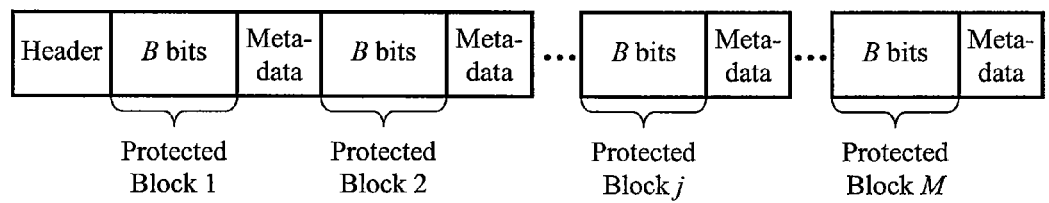
FIG. 8 illustrates a preferred structure of a logical protected file in a preferred embodiment of the present invention.

FIG. 8 illustrates the logical structure of the protected file F'. The initial contents of F', which compose the protected file header, contains per-file metadata such as the protected file identifier, access right information, and certain cryptographic key material that is associated with the protected file. The remainder of the protected file consists of M protected blocks that are interleaved with per-block metadata. The jth protected block, where j is an integer between 1 and M, corresponds to the jth block of the file F. The jth protected block of F' is simply the jth block of file F in encrypted form. In one or more preferred embodiments of the present invention, a symmetric-key cipher is used to encrypt blocks, and an encrypted block is the same size as an unprotected block, B bits. Preferably, a region of per-block metadata may include information such as hash fingerprints and cryptographic key material that is associated with the corresponding protected block. Preferably, the per-file metadata and the per-block metadata may be of fixed size or of a size that varies over time or that varies between protected blocks.

Figure 9:
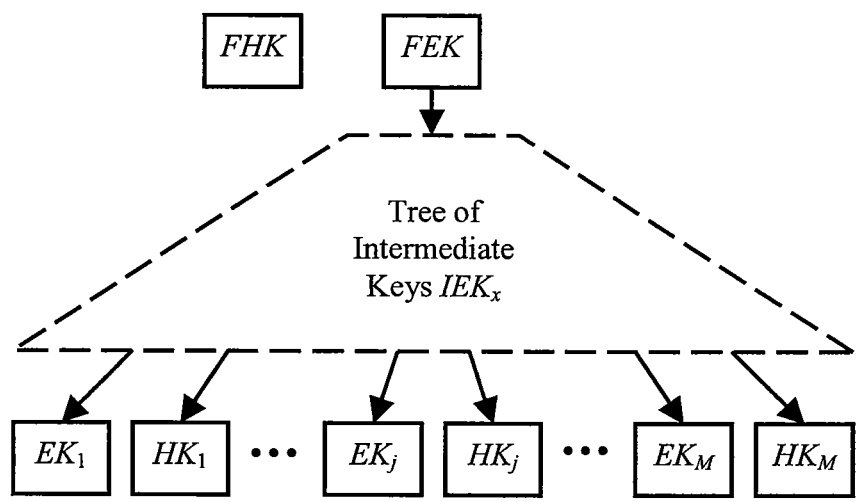
FIG. 9 illustrates a preferred cryptographic key hierarchy associated with a protected file in a preferred embodiment of the present invention.

In one or more preferred embodiments of the present invention, the protected file preferably is structured to interoperate with a preferred cryptographic key hierarchy. A preferred hierarchy for a single file consists of per-block keys $EK_j$ and $HK_j$, a file encryption key FEK, a file hashing key FHK, and possibly one or more intermediate encryption keys $IEK_X$. FIG. 9 illustrates a preferred cryptographic key hierarchy of the present invention. All keys except for the FHK are represented in a logical tree (henceforth called the "key tree"), in which the nodes represent cryptographic keys, and the arrows between nodes represent an encryption operation. For any node in the tree, the key associated with that node is encrypted with the key associated with its parent node, and the encrypted key is stored in either per-block or per-file metadata within the protected file. In a preferred embodiment, both the encryption and decryption algorithms can employ FEK to encrypt and decrypt data using a symmetric-key cipher. However, alternative embodiments of the present invention may employ separate encryption and decryption keys in conjunction with other types of algorithms (such as public-key ciphers) to perform encryption and decryption operations. Similarly, instead of using a single key to perform encryption and decryption steps in various operations described below, alternative embodiments of the present invention may employ separate encryption and decryption keys as well as different types of ciphers (such as asymmetric-key ciphers) to implement those steps."

Referring to FIG. 8, each of the M protected blocks is associated with a unique key for encryption and a unique key for keyed hash computation. The encryption key for the jth block is $EK_j$, and the hashing key for the jth block is $HK_j$. $EK_j$ is the secret key employed by a symmetric-key cipher to encrypt/decrypt the jth file block. $HK_j$ is applied as an input to an HMAC generation function along with the encrypted jth block and possibly other identifying information regarding the jth block (such as the value of j) to produce an HMAC $G_j$. $G_j$ and other relevant information associated with the jth block (such as initialization vectors or counters needed to facilitate the desired encryption mode of operation) are stored in the per-block metadata in unencrypted (i.e., plaintext) form.

Preferably, the keys used to encrypt the per-block keys are the intermediate encryption keys $IEK_X$, which are stored in a protected file in encrypted form. The plaintext versions of the keys in lowest tree level of intermediate keys are used to encrypt the per-block keys. EKj and HKj are stored in the per-block metadata in encrypted form (i.e., encrypted with the keys corresponding to the parent node). If there are several levels of intermediate keys, then intermediate keys in all levels except for the highest (topmost) level are encrypted using other intermediate keys that are their parents in the logical tree. The highest level of intermediate keys preferably are encrypted with the file encryption key FEK. In one or more preferred embodiments of the present invention, the intermediate keys may be stored in encrypted form in per-file metadata or per-block metadata. In addition, the intermediate keys may be encrypted and distributed across the per-block metadata associated with multiple protected blocks.

Depending on the characteristics of access patterns to protected files, a preferred cryptographic key hierarchy of the present invention may comprise a deep tree of intermediate keys, i.e., a tree with many levels. In addition, another preferred cryptographic key hierarchy of the present invention may comprise a broad tree of intermediate keys, i.e., a tree where intermediate key nodes have many children. Also, in a basic implementation of yet another preferred cryptographic key hierarchy of the present invention, no intermediate keys are employed, and the file encryption key FEK would be used to encrypt the per-block keys.

Preferably, the file encryption key FEK and the file hash key FHK, in one or more preferred embodiments of the present invention, are stored in the per-file metadata (possibly along with other access control information that is modifiable only by an authority) in encrypted form. In one or more preferred embodiments of the present invention, other system components that interoperate with a system utilizing one or more methods or software implementations according to the present invention may be relied upon to allow only authorized users to successfully obtain the FEK and the FHK in unencrypted forms (for use by such a system utilizing the present invention) through interaction with an authority.

Figure 10:
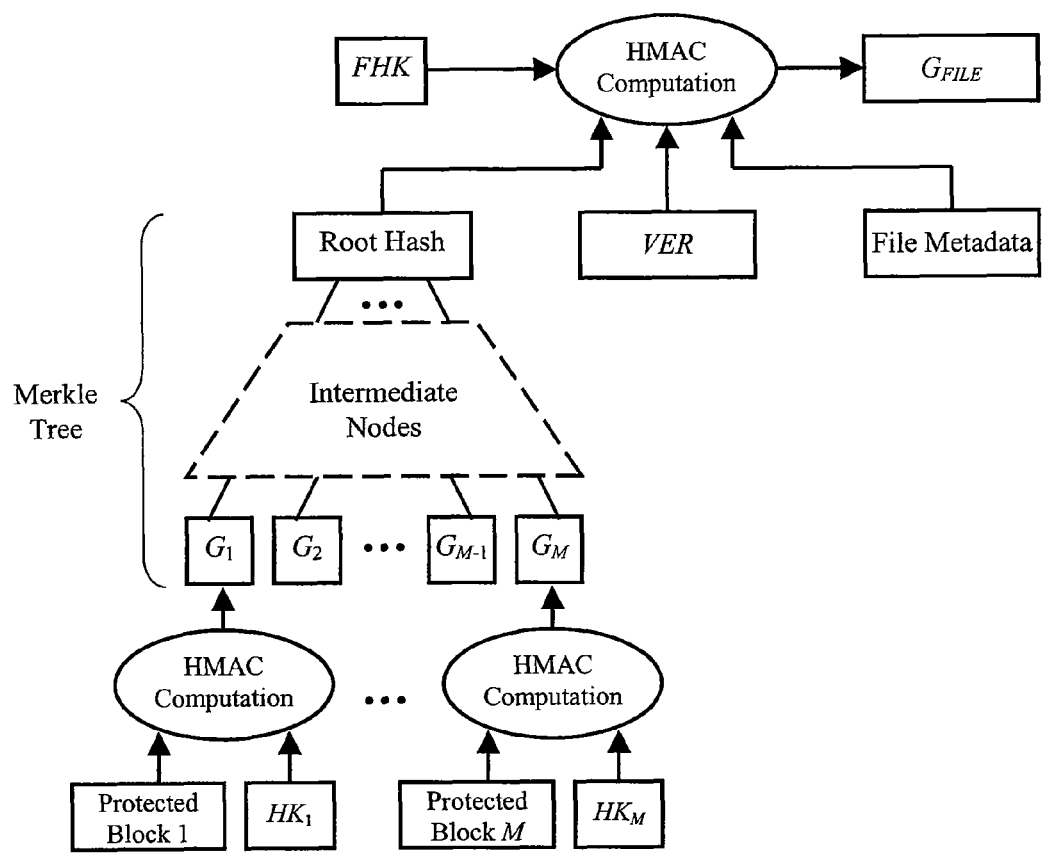
FIG. 10 illustrates a preferred cryptographic hashing scheme associated with protected files in a preferred embodiment of the present invention.

In a preferred embodiment, the FHK is used in concert with the per-block hash keys $HK_j$ and a Merkle hash tree to provide integrity for the file data and file metadata. However, as known to those skilled in the art, several other methods can be employed to achieve data integrity and data freshness verification goals; examples of such methods include but are not limited to digital signature schemes, simple per-file or per-block HMACs, and modes of operation for encryption algorithms that provide both confidentiality and integrity capabilities. FIG. 10 illustrates a preferred, simplified structure of a hashing implementation of the present invention. A single root hash for all of the file data is computed using a Merkle hash tree, as shown in the left side of FIG. 10. The leaf nodes of the tree are the per-block HMAC values $G_j$ (as described above), and a given intermediate node (or the root node) of the tree represents the output of a hash function computed over the hash values represented by the child nodes of that given node. Similarly to the handling of the intermediate keys $IEK_X$, the hash values corresponding to the nodes of the Merkle tree are encoded and efficiently distributed across the per-block metadata associated with several protected file blocks.

Preferably, in the per-file metadata for the protected file, a per-file hash $G_{FILE}$ is stored. The computation of $G_{FILE}$, as shown in FIG. 10, is the output of an HMAC function using the file hash key FHK and performed over the root hash of the Merkle tree, optionally over the hash of certain bits from the per-file metadata, and optionally over a file version number VER. The value of $G_{FILE}$ and the intermediate hashes can be used by the operations described below to efficiently verify the freshness and integrity of protected file data blocks and certain file metadata.

Given the structure of the protected file and the cryptographic key hierarchy, one or more preferred embodiments of the present invention comprise(s) the performance of one or a plurality of the following four operations: protected file reading, protected file writing, protected file access modification, and forced expiration of protected files. Though the following descriptions of preferred methods of the present invention for protected file reading and protected file writing relate only to a single protected block to be read/written, these operations can be easily modified, within the scope of the present invention, to accommodate multiple protected block reads/writes.

A preferred method of protected file reading according to the present invention comprises reading bits from the jth protected file block by an authorized user. Given FHK and FEK in plaintext form, certain per-file metadata (including $G_{FILE}$ and VER), the entire protected file block, and the corresponding per-block metadata are read from the storage device. Additionally, any per-block metadata is read from the storage device that is associated with the nodes in the key tree along the path of the FEK to the per-block keys for the desired protected file block. This path is called the key path. Also, any per-block metadata is read that is associated with the nodes in the Merkle hash tree along the path from the root hash to the desired protected file block HMAC. This path is called the hash path.

Next, the per-block values of $EK_j$ and $HK_j$ are obtained by decrypting the keys along the key path one by one. This process begins by decrypting the first intermediate key from the key path via a decryption algorithm using the key FEK, and the chain of decryption continues along the key path until $EK_j$ and $HK_j$ are deciphered. Then, the protected file block can be decrypted using $EK_j$ and possibly certain information from the per-block metadata.

Now, the integrity and freshness of the desired file block (and certain other file information) is verified as follows. The HMAC value $G_j$ is computed for the desired block using the key $HK_j$ over at minimum the (encrypted) file data block read from storage. Then, the expected value of $G_{FILE}$ is computed as follows. Beginning with the computed value of $G_j$, the nodes read from storage along the hash path are used to compute the root hash of the Merkle tree. Then, as shown in FIG. 10, this root hash is inputted to an HMAC function along with certain per-file metadata, the version VER read from storage (or that is obtained from a trusted party or a secured point of reference), and the key FHK, which enables the generation of an expected value of $G_{FILE}$. If this expected value differs from the value of $G_{FILE}$ read from storage, an error may be reported, as either the file has been modified in an unauthorized manner or certain file data has been rolled back to an earlier version of that data in an unauthorized manner. Optimizations can be applied to this process to accelerate the verification process and to distinguish between unauthorized file modification and unauthorized file rollback.

A preferred method of the present invention of writing bits to a protected file block by an authorized user comprises one or more of the following methods: overwriting data in an existing file block, writing data to a new protected block to the end of the file, or deleting data from the protected block at the end of a file.

A preferred method of overwriting data according to the present invention, wherein bits are to be written to existing protected data block j, comprises the initial steps of reading, decrypting and verifying the protected block j using the steps described above. Then, by replacing certain bits in the existing plaintext block with the plaintext bits to be written, a new plaintext block is generated. The new plaintext block is then encrypted with a new, randomly or pseudorandomly generated per-block key $EK_j$, and a new HMAC value $G_j$ is computed for the protected block is generated using a new, randomly or pseudorandomly generated per-block key $HK_j$. Using the values from the key path and the hash path obtained during the protected block reading process, the key tree and the Merkle tree are updated from the leaf node to the root node. Specifically, for each node in the key tree along the key path between the new $EK_j$ and the child of the key FEK (not including $EK_j$ and FEK), a new encryption key is randomly generated, and all of the children of that node are encrypted using the new encryption key. Each of the updated keys is written to its appropriate location in the file metadata. For each node in the Merkle tree along the hash path from the new $G_j$ and the root hash (excluding $G_j$ but including the root hash), new hashes are generated and written to their appropriate locations in the file metadata. Next, the value of VER is incremented by 1 and written back to the file (and possibly transmitted to a trusted party or a secured point of reference). Then, the new value of $G_{FILE}$ is generated by computing the HMAC using the key FHK over certain per-file metadata, the new value of VER, and the root hash. The new value of $G_{FILE}$ is then written to the protected file. In alternative embodiments of the present invention, depending on the security goals, the initial steps of overwriting protected block data recited above may not require reading, decrypting, and verifying the existing protected block in the event that the entire protected data block is to be overwritten.

In a preferred method of writing data to a new protected block at the end of a file, wherein B or fewer new bits are to be appended to the end of the protected file by creating a new protected file block at the end of the file, if the number of bits to be written is fewer than the preferred protected file block size B, then the bits to be written are appended with zeroes such that the number of bits to be written is B. Next, the key path and the hash path are read (as described above), but no block is decrypted or verified. Now, as in the preferred method of overwriting data in existing file blocks as described above, new keys $EK_j$ and $HK_j$ are created, and the protected file block is encrypted and hashed. The resulting encrypted block and associated per-block metadata are then written to the protected file. The key tree, the Merkle hash tree, the value of VER, and the file hash $G_j$ are then updated as described with respect to the preferred method of overwriting data in existing file blocks as described above, but depending on the number of blocks in the file, the number of nodes in the two trees may be expanded to ensure that the trees remain balanced.

A preferred method of deleting data according to the preset invention, wherein B or fewer bits are to be deleted from the protected block at the end of the protected file, if the number of bits to be deleted is fewer than the number of data bits (not including zero padding bits) in the protected block at the end of the file, then a new protected block is written to the file using the preferred method of overwriting data described above. The new protected plaintext block would simply be the original plaintext blocks in which certain bits are replaced with zeroes. If the number of bits to be deleted is equal to the number of data bits in the protected block at the end of the file, the entire block is to be deleted. In this scenario, the key tree and the hash path are read (as performed in the first preferred operation). The Merkle hash tree, the value of VER, and the file hash $G_j$ are then updated as described above with respect to the preferred method of overwriting data described above, but depending on the number of blocks in the file, the number of nodes in the Merkle tree and in the key tree may be reduced to ensure that the trees remain balanced.

In a preferred method of the present invention for modifying an entity's access rights to a protected file, given the values of FEK and FHK in unencrypted form, the authorized entity requests an access control rights modification from an authority using certain information that may be obtained from the protected file. If the authority grants the request, new keys $FEK_{NEW}$ and $FHK_{NEW}$ (and in some cases, new metadata) are provided to the authorized requesting entity in plaintext and ciphertext forms. If new metadata is provided, the requesting entity writes that metadata to the appropriate location(s) with the protected file. In a system utilizing a software implementation according to the present invention, other system components that interoperate with such software implementation may be relied upon to obtain new keys $FEK_{NEW}$ and $FHK_{NEW}$ in encrypted and unencrypted forms (for use by such software implementation according to the present invention).

Next, the authorized entity reads the following information from the stored file: the root hash of the Merkle tree and the existing per-file metadata (which includes the value of VER). The authorized entity increments the value of VER by 1, and then the entity generates a new $G_{FILE}$ by using the key $FHK_{NEW}$ to compute the HMAC over the root hash of the Merkle tree, the incremented value of VER, and certain per-file metadata. Furthermore, the children of the key FEK in the key tree are read from the file metadata, decrypted with FEK, re-encrypted with $FEK_{NEW}$, and the new encrypted values of those keys are written to the file metadata. Next, the new value of $G_{FILE}$, the $FHK_{NEW}$ in ciphertext form, the $FEK_{NEW}$ in ciphertext form, and possibly other per-file metadata (including the new value of VER) are written to the file. Lastly, new value of VER may be transmitted to a trusted party or a secured point of reference.

Because of the manner in which the Merkle tree and the key tree are updated during a protected file write operation, this access right modification operation may virtually ensure that entities cannot access new data written to a file after their access rights are revoked, and the operation may virtually ensure that entities cannot access data that is not currently stored in the file but was stored in the file prior to the time at which those entities obtained access to that file.

A preferred method of the present invention for disabling access allows for the prevention of future access to the plaintext data of a protected file or certain protected file blocks without explicitly deleting all copies the protected file or the protected file blocks. With respect to this preferred method of the present invention for disabling access, a set of possible data classifications exist wherein each classification is associated with a unique encryption key, and all copies of that key are maintained, protected, and tracked by a trusted authority (such as a centralized administration server) that may exist inside or outside of the software and supporting hardware of a system in which preferred methods of protected data accesses are performed. At the time when a file is initially protected or at the time when a new protected file is created, the protected file can be associated with one or more classifications. For a file associated with Y classifications, the ciphertext versions of the FEK and FHK generated by a trusted authority are equivalent to the values of FEK and FHK recursively encrypted at least Y times, at least once with each encryption key corresponding to any of the Y classifications. When an authorized entity requests the decryption of the FEK and the FHK in order to read, write, or change access to the file, the trusted authority performs the Y recursive decryptions using the Y classification keys without releasing the key to the authorized entity or to an untrusted environment. In order to permanently disable access to all files with a particular classification, the authority simply deletes all copies of the encryption key associated with that classification from its volatile and non-volatile storage. By the properties of strong symmetric-key encryption algorithms, if any entity ever requests the decryption of the FEK or FHK for a file that possesses a classification associated with a deleted key, then no entity—including the trusted authority—will be able to decrypt the FEK and FHK for that file. However, alternative embodiments of the present invention may employ separate encryption and decryption keys in conjunction with other types of algorithms (such as public-key ciphers) to perform encryption and decryption operations conducted by the trusted authority, and a preferred embodiment described herein can be easily extended to disable access to both encryption keys and decryption keys associated with data objects.

This preferred method of disabling access can be extended as follows to prevent all future access to individual blocks within files instead of only to files as a whole. An individual block may be classified in the same way that a file can be classified. During a protected block write operation, in addition to encrypting the block encryption and hashing keys $EK_j$ and $HK_j$ corresponding to that block using keys from the key tree, the encrypted results are provided to the trusted authority and are encrypted again using one or more classification keys. The trusted authority then returns the doubly encrypted results, and these results are stored in the protected file. Similarly, during a protected block read operation, the relevant block encryption and hashing keys are first provided to the trusted authority for decryption using a classification key prior to being decrypted using keys from the file's key tree. As in the file classification case, if a classification key is destroyed by the trusted authority, then the encrypted blocks associated with that classification will not be accessible in the future by any entity.

Additional steps may be added and optimizations may be performed to each of these preferred operations to provide additional security services and improve performance, respectively.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method for reading a protected data object stored in a memory of a computer, the protected data object comprising encrypted data blocks and a region of data block metadata, the region of data block metadata associated with at least one of the encrypted data blocks, the method comprising:

reading a first encrypted data block of the encrypted data blocks from the memory, the protected data object including a plurality of regions of data block metadata interleaved between the encrypted data blocks;

reading a hierarchical key tree associated with the protected data object from a) the region of data block metadata or b) a data object header stored in the protected data object;

decrypting, in succession, using a set of first decryption algorithms, encrypted first path keys on a first key path of the hierarchical key tree from a top node of the hierarchical key tree including a plaintext version of a received data object decryption key to a node in a bottom row of the hierarchical key tree including an encrypted per-block decryption key for the first encrypted data block, the decrypting including decrypting the encrypted first path keys starting with decrypting one of the encrypted first path keys immediately following the data object decryption key using the data object decryption key and continuing with decrypting the next encrypted first path key with a decrypted version of a preceding first path key moving from the top node to the bottom row until a decrypted version of the per-block decryption key for the first encrypted data block is obtained; and decrypting, using the per-block decryption key and a second decryption algorithm, the first encrypted data block to produce a first decrypted data block.

2. A computer implemented method for reading a protected data object stored in a memory of a computer, the protected data object comprising encrypted data blocks and a region of data block metadata, the region of data block metadata associated with at least one of the encrypted data blocks, the method comprising:

reading a first encrypted data block of the encrypted data blocks from the memory, the protected data object including a plurality of regions of data block metadata interleaved between the encrypted data blocks;

reading a hierarchical key tree associated with the protected data object from a) the region of data block metadata or b) a data object header stored in the protected data object; and decrypting, in succession, using a set of first decryption algorithms, encrypted first path keys on a first key path of the hierarchical key tree from a top node of the hierarchical key tree including a plaintext version of a received data object decryption key to a node in a bottom row of the hierarchical key tree including an encrypted per-block hash key for the first encrypted data block, the decrypting including decrypting the encrypted first path keys starting with decrypting one of the encrypted first path keys immediately following the data object decryption key using the data object decryption key and continuing with decrypting the next encrypted first path key with a decrypted version of a preceding first path key moving from the top node to the bottom row until a decrypted version of the per-block hash key for the first encrypted data block is obtained.

3. The computer implemented method as defined in claim 2, further including generating for the first encrypted data block, a generated per-block hash value or a generated per-block hash message authentication code (HMAC) using as inputs at least one of the per-block hash key and data contained in the first encrypted data block.

4. The computer implemented method as defined in claim 3, further including comparing the generated per-block hash value for the first encrypted data block with a stored per-block hash value read from the memory.

5. The computer implemented method as defined in claim 3, further including comparing the generated per-block HMAC for the first encrypted data block with a stored per-block HMAC read from the memory.

6. The computer implemented method as defined in claim 3, further including reading a portion of a hash tree associated with the protected data object and a stored data object hash value or data object HMAC from the region of data block metadata and the data object header.

7. The computer implemented method as defined in claim 6, wherein the hash tree has a row of bottom nodes each including (i) a stored per-block hash value for the first encrypted data block or (ii) a stored per-block HMAC for the first encrypted data block.

8. The computer implemented method as defined in claim 7, further comprising generating a generated data object hash value for the protected data object using the hash tree by at least one of:

(i) substituting the generated per-block hash value for the first encrypted data block for the stored per-block hash value for the first encrypted data block in the row of bottom nodes, and recalculating the portion of the hash tree to produce the generated data object hash value; or (ii) substituting the generated per-block HMAC for the first encrypted data block for the stored per-block HMAC for the first encrypted data block in the row of bottom nodes, and recalculating the portion of the hash tree to produce the generated data object hash value.

9. The computer implemented method of claim 8, further including generating a generated data object HMAC for the generated data object using a decrypted version of an encrypted data object hash key read from at least one of the regions of data block metadata or the data object header and the data object hash value as inputs to a hash function.

10. The computer implemented method of claim 9, further including comparing the generated data object HMAC for the generated data object with a stored data object HMAC for the data object read from the memory.

11. The computer implemented method of claim 10, further including issuing a notification that the data from the first encrypted data block has been at least one of modified or accessed without authorization if the generated data object HMAC for the generated data object is not equal to the stored data object HMAC for the generated data object.

12. The computer implemented method of claim 10, further including issuing a notification that the data from the first encrypted data block has been at least one of modified or accessed without authorization if the generated per-block HMAC for the first data block is not equal to the stored per-block HMAC for the first data block.

13. A computer implemented method for enforcing access rights changes for a protected data object stored in a memory of a computer, wherein the protected data object comprises data blocks and a region of data block metadata associated with at least one of the data blocks, the method comprising:

reading a hierarchical key tree from the memory, wherein the hierarchical key tree includes A) a first data object decryption key disposed in a top node of the hierarchical key tree and B) at least one of 1) an intermediate row of nodes wherein each of the nodes contains an encrypted intermediate decryption key and a bottom row of nodes wherein each of the nodes contains at least one key and 2) an encrypted per-block decryption key, wherein a plurality of key paths, each consisting of two keys, have been defined in the hierarchical key tree, the key paths having a first end point including the top node and a second end point including one of the nodes in the intermediate row of nodes or one of the nodes in the bottom row nodes;

decrypting, using the first data object decryption key, each encrypted key in succession on each of the plurality of key paths, except for the first data object decryption key, the decrypting starting with decrypting the encrypted key immediately following the first data object decryption key using the first data object decryption key and continuing with decrypting the next encrypted key on the key path with decrypted version of a preceding key on the key path moving from the top node to the second end point of the key path;

generating a new data object decryption key and a corresponding new data object encryption key associated with the protected data object, the protected data object including a plurality of regions of data block metadata interleaved between the data blocks; and encrypting each key on each of the plurality of key paths, by starting at the second end point of each of the key paths and encrypting each key on the key path, except for the new data object encryption key, with the new data object encryption key.

14. The computer implemented method of claim 13, further including, after the encrypting, writing the encrypted keys on the plurality of key paths to a subset of the nodes of the hierarchical key tree that is stored in the memory.

15. The computer implemented method of claim 13, further including discarding at least one of encrypted versions or plaintext versions of the first data object decryption key and of any data object encryption key corresponding to the first data object decryption key.

16. The computer implemented method of claim 13, wherein the new data object encryption key is equivalent to the new data object decryption key.

17. The computer implemented method of claim 13, wherein the new data object encryption key is not equivalent to the new data object decryption key.

18. The computer implemented method of claim 13, wherein the generating is initiated by an entity having authority to modify access rights to the protected data object.

19. The computer implemented method as defined in claim 1, wherein substantially all of the data block metadata associated with its corresponding data block reside in a location preceding its corresponding encrypted data block in a location ranging from the immediate preceding adjacent location to its corresponding encrypted data block to a potential maximum distance location at a location following the data object header but preceding the first allowable data block location.

20. The computer implemented method as defined in claim 1, wherein substantially all of the data block metadata associated with its corresponding data block reside in a location following its corresponding encrypted data block in a location ranging from an immediately-following location to its corresponding encrypted data block to a potential maximum distance location at a location after the location of the last data block within the data object.

21. The computer implemented method as defined in claim 1, wherein substantially all of the data block metadata can be parsed to multiple pieces consisting of varying lengths or sizes up to any sufficient number of N bits and such individual parsed data block metadata reside in locations both preceding and following said corresponding data block in locations including but not limited to immediately adjacent to a potential maximum distance location at a location following the data object header but preceding the first allowable data block location, or to a potential maximum distance location at a location after the location of the last data block within the data object.

22. The computer implemented method as defined in claim 3, further including incrementing the version number for the data object prior to generating the new data object hash message authentication code.

23. The computer implemented method of claim 13, further including, after the encrypting, writing the encrypted keys on the plurality of key paths to a subset of the nodes of the hierarchical key tree that is accessed by the machine via network interface to another memory location that is capable of storing such information.

24. The computer implemented method of claim 13, further including, after the encrypting, writing the encrypted keys on the plurality of key paths to a subset of the nodes of the hierarchical key tree that is accessed by the machine via peripheral storage medium such as removable storage.

* * * * *